(12) United States Patent
Peterson

(10) Patent No.: US 7,023,651 B1
(45) Date of Patent: Apr. 4, 2006

(54) REDUCTION OF TAPE VELOCITY CHANGE BACKHITCH TIME THROUGH USE OF AN INTERMEDIATE BACK VELOCITY

(75) Inventor: David L. Peterson, Boulder, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 10/890,961

(22) Filed: Jul. 14, 2004

(51) Int. Cl.
*G11B 5/584* (2006.01)

(52) U.S. Cl. .................................. 360/77.12
(58) Field of Classification Search ............... None
See application file for complete search history.

(56) References Cited

U.S. PATENT DOCUMENTS 4,176,380 A  11/1979  Koski et al.
6,307,701 B1 * 10/2001  Beavers et al. ......... 360/73.08
2003/0137768 A1 * 7/2003  Chliwnyj et al. ....... 360/77.12

* cited by examiner

Primary Examiner—David Hudspeth
Assistant Examiner—Mitchell Slavitt
(74) Attorney, Agent, or Firm—Brooks Kushman P.C.

(57) ABSTRACT

Modern tape drives can adjust their tape drive velocity between two or more read/write data rates to better match the data rate demands of the host. This velocity changing may provide improvements in drive performance and total backhitch counts. The transition from one tape velocity to another may involve a rate change backhitch which itself could impact performance. It is desirable to optimize these transitions. In one approach, a backhitch involves a back-velocity having a magnitude that is intermediate between the initial tape velocity and the final tape velocity. In another approach, a backhitch involves an intermediate forward velocity to quicken the approach toward the start R/W reposition point.

13 Claims, 3 Drawing Sheets

REDUCTION OF TAPE VELOCITY CHANGE BACKHITCH TIME THROUGH USE OF AN INTERMEDIATE BACK VELOCITY

BACKGROUND OF THE INVENTION

1. Field of the Invention

The invention relates generally to tape magnetic recording, and more particularly to optimizing tape velocity changes in response to presented host data rates.

2. Background Art

Data buffers are used to assist streaming of write data from a host or streaming read data out to a host. A buffer enables storage of data to or from data compressors to compensate for mismatches in the front end versus back end data rates and intermittency in data flow. This is needed because the host can present a variety of data rates and compressions while the drive can function at just one or a few single rates.

Current magnetic tape storage devices include flexible magnetic tape moving from one tape spool to another while a read/write (R/W) head(s) reads or writes data from or onto the tape. Ideally, the host and drive perform streaming R/W with few interruptions. However, there are many circumstances where the drive has to stop. Examples include: defects on tape result in errors that require retrying reading or writing at some tape location, servo tracking becomes deficient and also requires read or write retries, data buffer becomes empty of write data, or the buffer becomes full of read data.

Stopping and restarting the tape in the drive from some given position on tape is accomplished by decelerating the tape velocity to zero at some forward position and then backwards to negative velocities with respect to the recording head. There may also be a settling time for ensuring precise tape velocity and acquisition of the proper data track by the head positioning servo system. Then the tape is accelerated until it again stops to zero velocity at some position behind the original given position. This is called the reposition point. In some cases, the tape may sit motionless at that position until given the signal to again accelerate forward to the starting point. This whole sequence is called a backhitch or football. FIG. 1 illustrates a conventional backhitch. One reason for the name football is the shape of the sequence in phase space—velocity plotted against position. Depending on how the axes are stretched or expanded, the phase plot resembles a football either lying on its side or vertically.

Modern data tape drives tend to move tape at increasingly higher velocities and higher data rates. This has competitive advantage when the host presents or requests data at high data rates. Depending on block or record size, data compressibility, interface data rate, contention, or host limitations, the data rate to or from the host may be arbitrarily lower than maximum. In response to this, in some data transfer scenarios, there is an advantage to selectively changing the velocity at which tape moves.

A performance advantage may exist when data buffer size is large enough so as to prevent the filling of the buffer during a football or backhitch. For a given reel drive-motor providing tape acceleration a (m/s/s), football motion time, f (s), may increase with tape velocity, v (for example, f=4v/a). Ideally, a data buffer of size B (MB) should be approximately large enough so that B>B_critical=Df where D is the native 1:1 drive rate in megabytes per second. At high velocities of tape movement, new large buffers may be too expensive so that this condition is not satisfied. Then moving to a lower drive rate will make the condition true. For example, if D=kv where k is some constant, then $$B\_critical = Df = (kv)(4v/a) = (4k/a)v^2$$

And B_critical<B will certainly be true at some lower velocity, v. Also, if B<Df, then host disconnect time may be required during the completion of a football. Whenever the drive is disconnected due to a football and the host is also disconnected (due to buffer-full on writes or buffer-empty on reads), then these disconnects represent wasted time that results in reduced net average host throughput, that is, lost performance. Sometimes, a portion of that lost performance can be regained by moving to a slower velocity where football time is lower.

Even when buffers are large and well managed, a mismatch between data rate to or from the host and the data rate of the drive can cause a large number of footballs that progressively increase with the mismatch. With changing velocities, changing accelerations, and perhaps changing tape tensions, high backhitch counts may strain the drive and tape and affect either drive or tape durability. High counts are undesirable. In some cases, fairly large buffers minimize performance impact, and backhitch counts become the dominant reason for performing tape velocity changes.

An example of football counts is given by the formula, N=capacity (D-c)/BD, where B=buffer size for compressed data, D=drive rate, c=compressed data rate between the compressors and data buffer, and capacity could be total drive capacity or some other reference capacity (such as data transferred to tape during an end to end tape motion). This formula assumes that the buffer is being filled with write data up to size B and that the drive rate is larger than the compressed data rate. N is proportional to the difference (mismatch) between D and c.

If a buffer is not managed well so that write filling only occurs during a football time, then many more footballs may exist. At low data rates, c<<D, these counts can become huge and point to the need to fill the buffer as full as possible.

If the compressed data rate is falling from a high value near drive rate, football counts will rise to high counts. If another lower tape velocity is available, then the tape velocity should be dropped so that the value of the mismatch (D_low−c) is a smaller value than (D_high−c). This resets the football count to a low value.

Ideally, continuous drive rate changes always enable a match between D and c so that performance is high and football counts are low. Often, however, only a few select drive rates may exist. Further, the act of changing from one velocity to another could impact performance.

Additional background information may be found in U.S. Pat. No. 4,176,380.

For the foregoing reasons, there is a need to minimize the duration from one tape velocity to another when attempting to better match the data rate demands of the host.

SUMMARY OF THE INVENTION

It is an object of the invention to provide an improved approach to transitioning from one tape velocity to another tape velocity that uses a backhitch, wherein the backhitch time is reduced through the use of an intermediate peak back speed.

It is another object of the invention to provide an improved approach to transitioning from one tape velocity to another tape velocity that uses a backhitch, wherein the backhitch time is reduced through the momentary use of an intermediate forward speed that exceeds the final tape velocity.

The invention involves tape data recording, and tape velocity changes in response to presented host data rates. Modern tape drives can adjust their tape drive velocities between two or more read/write data rates to better match the data rate demands of the host. This velocity changing may provide improvements in drive performance and total backhitch counts. The transition from one tape velocity to another may involve a rate change backhitch which itself could impact performance. It is desirable to reduce the time it takes to perform these transitions. One way to improve performance is to use a backhitch in which the back velocity has peak magnitude that is intermediate between the tape velocity going into and out of the rate change backhitch. One aspect within the scope of the invention involves the reducing of tape velocity change backhitch time through use of an appropriate intermediate back velocity.

The invention comprehends several additional aspects at the more detailed level. Rate-change-footballs can have many shapes in phase space, v=v(x). The invention contemplates a special set of these rate-change-footballs where the back velocity peak magnitude is intermediate the tape velocity going into and out of the rate-change-backhitch.

Put another way, in changing from high velocity (V_in) to low velocity (V_out), a general choice might be to decelerate tape from the high incoming rate, V_in all the way to the bottom of the football so that the negative velocity at the bottom has the same magnitude as the incoming velocity at the top. Generally, but not necessarily, this shape will be determined by a nearly constant value of acceleration or deceleration. The plot to the reposition point will then show quarters of the football that may look the same. Another general choice may be to progress from V_in to a back velocity of magnitude V_Out at the bottom of the football.

In one aspect of the invention, calculation of the total time spent in performing the rate-change-football shows that both of these general choices are not as good as a choice contemplated by the invention in which the peak back velocity magnitude at the bottom is an intermediate value between the initial and final velocity. The calculation may be made directly from the phase plot via evaluation of the line integral. Depending on the values of tape velocity available, using an intermediate peak back velocity might decrease the backhitch time by 10–35% relative to using the peak back velocities of either V_in or V_Out. This can be a significant savings for high performance systems, and the invention contemplates various rate-change-footballs that involve an intermediate peak back velocity.

Another way to improve performance in accordance with the invention is to use a backhitch in which the backhitch time is reduced through the momentary use of an intermediate forward velocity that exceeds the final tape velocity when coming out of the backhitch. This approach of using an intermediate forward velocity may be used in applications that may or may not utilize an intermediate peak back velocity.

BRIEF DESCRIPTION OF THE DRAWINGS

FIG. 2 shows a possible choice for a rate-change-football from a higher to a lower velocity; the back velocity at the bottom of the football is equal in magnitude to the high velocity in;

DETAILED DESCRIPTION OF THE PREFERRED EMBODIMENTS

Figure 1:
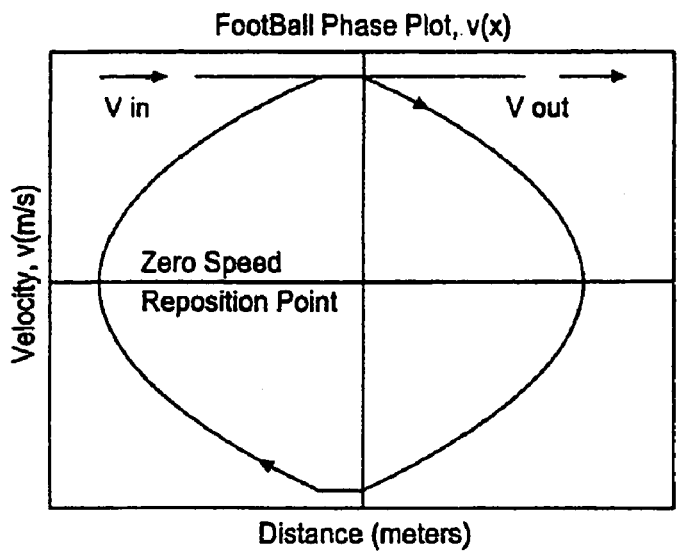
FIG. 1 shows a typical backhitch or football phase profile where the x-axis is distance and the y-axis is velocity with "+" being forward and being backward velocity.

For the elementary case of both acceleration and deceleration having a constant magnitude, the optimal back velocity is found by taking the derivative of the total time with respect to the back velocity, setting it to zero, and solving for the unknown optimal back velocity that gives minimal time. For example, optimal back velocity may be:

$$\sqrt{\tau v a + \frac{1}{2}(V^2 + v^2)},$$

where V is V_in, v=V_out, a=acceleration (m/s/s), and τ=settling time. In other cases, acceleration may not be constant, and the optimal back velocity can be found via spreadsheet or by solving non-linear equations. Plots of total football time versus possible intermediate back velocities will show a U shape between V_back=V_in and V_back=V_out. The shape may not be symmetrical and could be more sudden on one side than on the other. In that case, it may be desirable to select a back velocity away from the steep side so that total time is more robust against variations in actual execution of the football. A simple choice of back velocity as the average of V_in and V_out is still better than the extremes: V_in and V_out.

At lower compressed data rates, buffer management techniques may often artificially enhance football times so that the buffer can be nearly filled by write data even when football times are short. In particular, if r is reposition time for the first three quarters of a football, and s is the time from the last quarter start to finish, then the normal football time is f=r+s. But another time might be added for sitting at the reposition location until the buffer fills to some high water mark or trigger point. If this extra delay time is d, then the total effective football time is T=f+d=r+d+s.

The addition of another delay time, d, is only useful if the football time is relatively short. The general problem for high performance drives at high rates is the football time being too long already and that is why the optimization of football time is important. For writes with c<D_high, there is lost performance whenever both drive and host are disconnected from the data buffer, for example, when a football is being performed and the data buffer is full for writes. If a normal football time is f, then the buffer will just fill during a football when cf=B=buffer size. Thus, the critical c-rate, c_critical=B/f for a given drive rate and associated football time. A rate change can improve performance when it occurs towards a new drive velocity D_low>c_critical=B/f.

The lower drive velocity will enable a lower football time and could avoid host disconnects. Unless capacity is sacrificed by skipping over a section of tape, a rate change will require a rate-change-football. Without optimization of the football time, this rate-change-football may also cause a host disconnect and prolong the accumulation of disconnect time and lost performance. Once it has been decided to perform a rate change, it is best to do so as soon as possible without sacrificing more performance. The important measure is keeping the accumulated host disconnect time as low as possible when summing over footballs.

This is also true for velocity changes from low to high. If c>D_low for writes, then the buffer may stay near full and chatter near the top with small drains to tape and small data adds from the host through the compressors. The small drain increments mean that performance is less due to host disconnects. A switch to higher drive/tape velocity alleviates this situation and regains performance. But during the rate-change-football, no data can flow to tape; and since the initial condition was buffer-full, no data can flow into the buffer either. This is lost performance and needs to be fixed as quickly as possible (for example, using an optimized rate-change-football).

How velocities are changed may depend on the rate change algorithm being used; and there are many possible choices. To determine that a rate change downwards in tape velocity is desirable, it may first be necessary to measure the compressed data rate, c (MB/s) between compressors and data buffer.

If the drive rate is high and if c is low below the natural data rate of the low velocity of the drive, D_low, then performance and/or football counts may be poor. It is not desirable to have this state exist for long. Rather than waiting till the next buffer empty (for writes) or buffer full (for reads), it is possible to do a quicker rate change football earlier (for example, earlier than the start of f_down in FIG. 7).

Another advantage that may exist at lower velocities is servo off track (SOT) recovery. SOT can occur when the lateral head position on tape is too far away from nominal. This means that the position error signal (PES) has exceeded an SOT distance threshold.

For writes, an SOT might result in a stop-write where the write current is turned off to prevent writing over adjacent track data. On older drives, this may also require retries near the same place on tape. A retry at the same velocity may succeed simply because the cause of the SOT wasn't repeatable. If not, then a later retry at low velocity might succeed because the PES amplitude may be lower at lower velocity.

For reads, large SOTs may not be flagged as such but high PES excursions may still impact the error correction code (ECC) so that it does not pass. A read PES excursion has a width in millimeters that also tends to increase with tape velocity, and wider excursions may mean more ECC symbols in error. Again, slowing down the tape velocity on a retry might lower the PES amplitude but decrease the PES excursion width also so that the ECC may now pass.

For R/W data recovery due to associated servo off-tracks (SOTs), introducing a data recovery step in which the tape velocity is reduced to a lower value can be beneficial. The lower tape velocity should lead to lower amplitude of PES (position error signal) and a shorter PES width. Going off-track on a write may result in partial overwriting of adjacent tracks before the write current is shut off. Going off-track on a read may produce poor margin for write to read track misregistration (TMR). If a reader on a given written track of data is also partly reading an adjacent track of data, then its effective signal-to-noise (SNR) error can become poor enough so that ECC symbols are in error. Too many symbols in error can exceed the ability of the ECC and lead to a transient error that requires a football for retry. If a few repeats fail to solve the problem, then a rate change football to a lower velocity may reduce the error and enable a pass. Again, these rate change footballs represent wasted performance. So it desirable to have them occur as quickly as possible.

Figure 2:
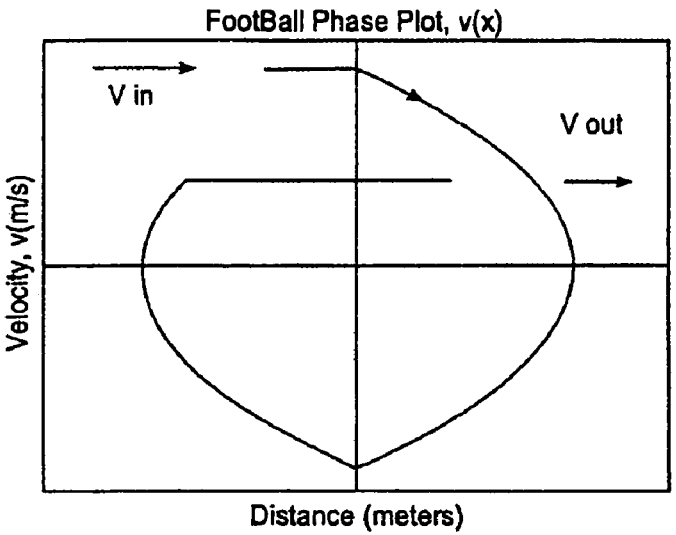
Figure 3:
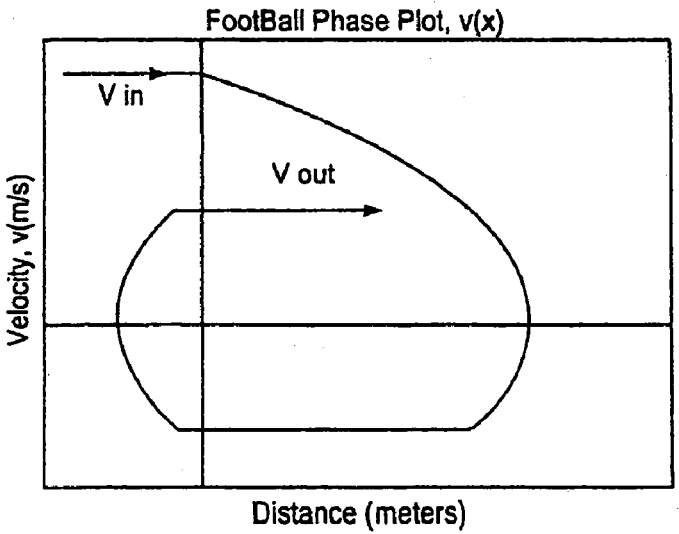
FIG. 3 shows another possible choice for a velocity change down; the magnitude of the back velocity at the bottom is the final velocity out.

With reference now to the drawings, FIG. 1 shows a typical backhitch. The right side of FIG. 1 is deceleration of motion from full velocity to stop to reverse velocity. The left side of FIG. 1 is acceleration of motion from backvelocity to stop (called the reposition point) to full velocity again. The short longitudinal section between left and right represents a needed delay time for the servo to acquire the R/W track and other preliminary activity for recommencing reads or writes. FIG. 2 shows a rate change football from a higher to a lower velocity. The backvelocity at the bottom of the football is equal in magnitude to the high velocity in. The long coasting time at the out velocity causes a relatively long football time. FIG. 3 shows another possible choice for a velocity change down. In this case, the magnitude of the backvelocity at the bottom is the final velocity out. Again, this is a relatively long total football time.

Figure 4:
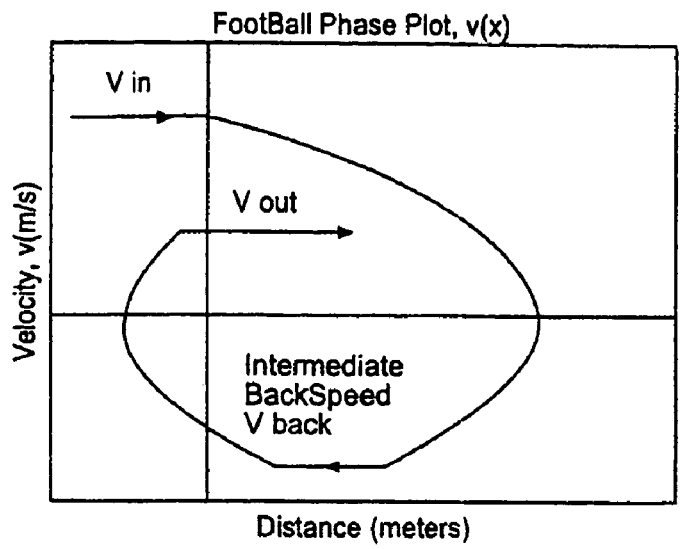
FIG. 4 shows an improved choice for a velocity change down; the magnitude of the back velocity at the bottom is an intermediate velocity between the velocities in and out.
Figure 5:
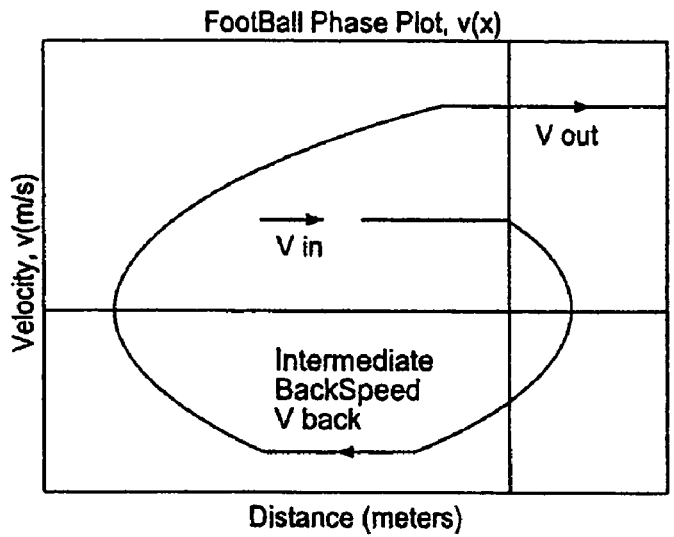
FIG. 5 shows a rate-change-football from low velocity to high velocity using an intermediate back velocity.
Figure 6:
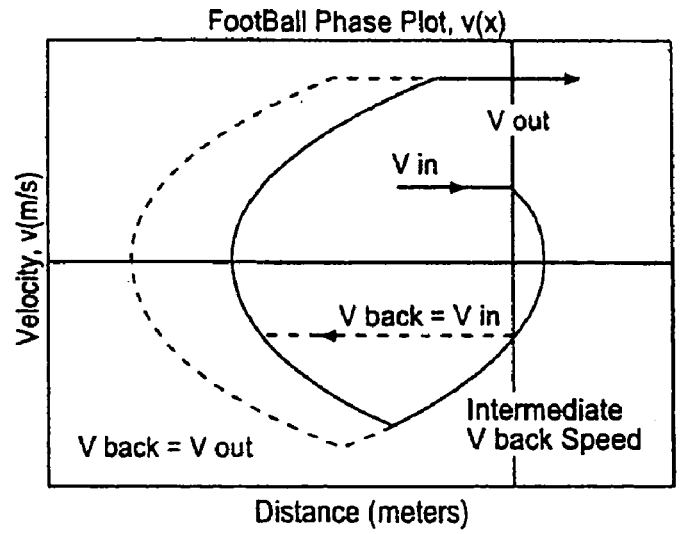
FIG. 6 shows three possible football phase plots from low velocity to high velocity with the middle plot having an intermediate back velocity; this illustrates the relationship among the different possibilities.

FIG. 4 shows an improved choice for a velocity change down. In this case, the magnitude of the backvelocity at the bottom is intermediate between the velocities in and out. FIG. 5 shows a rate change football from low velocity to high velocity using an intermediate backvelocity. FIG. 6 shows three possible football phase plots from low velocity to high velocity with the middle plot having an intermediate backvelocity.

Figure 7A:
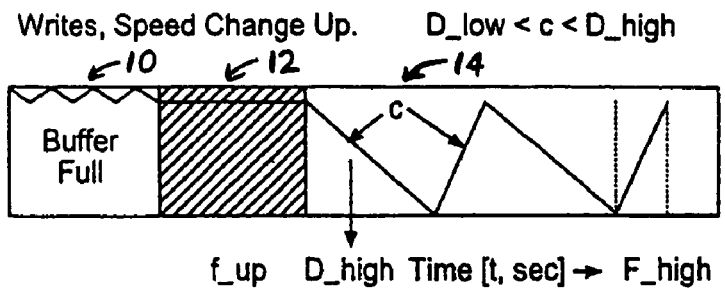
FIGS. 7 A–B show buffer waveforms when changing tape velocity upwards or downwards.
Figure 7B:
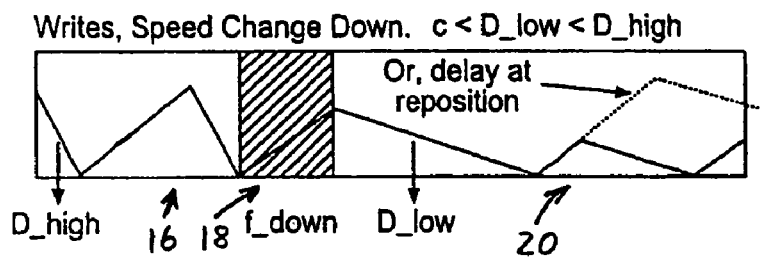

FIGS. 7A–B show buffer waveforms when changing tape velocity upwards (FIG. 7A) and downwards (FIG. 7B). The y-axis is the degree of filling of the data buffer during write activity from the host through compression to the data buffer. FIG. 7A begins with a condition of buffer chatter in which a rate into the buffer exceeds the ability of the buffer to drain to tape, generally indicated at 10. At some point, a decision is made to perform a rate change football from low to high tape velocity. The rate change football going up to the higher velocity is indicated at 12 and impacts net performance because no data enters or leaves the buffer during football time. After the football, the buffer resumes filling and draining between nearly empty and nearly full; this is indicated at 14.

FIG. 7B begins with a condition of the rate into the buffer being less than the low tape velocity with quick draining taking place because the drive is operating at the high tape velocity. This is indicated at 16. The quick draining is followed by a standard football at high tape velocity during which the buffer partly fills from the input rate. The buffer then drains again to buffer empty at which point a rate change football occurs from high tape velocity to low tape velocity, indicated at 18. The rate change down need not impact net performance unless it causes a host disconnect. The result of switching to a low velocity can be a longer period with draining at a slower rate, indicated at 20. The rate in and out is more closely matched to the host than it was previously. The low velocity football time is now less than the prior high velocity football time and the buffer partly fills during this time. There could optionally be a delay at the reposition point of footballs after buffer-empty so that the buffer can fill to more nearly full.

Figure 8:
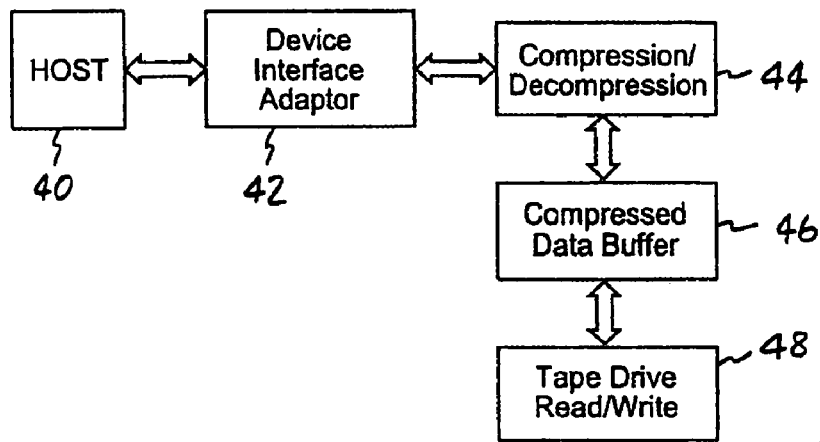
FIG. 8 is a block diagram of the data path from host to drive adaptor to compressors to data buffer to read/write drive.

FIG. 8 is a block diagram of the data path from host 40 to drive adapter 42 to compressors 44 to data buffer 46 to read/write drive 48. The data rate c occurs between the compressors 44 and the data buffer 46. The data rate d occurs between the buffer 46 and the magnetic tape 48.

Figure 9:
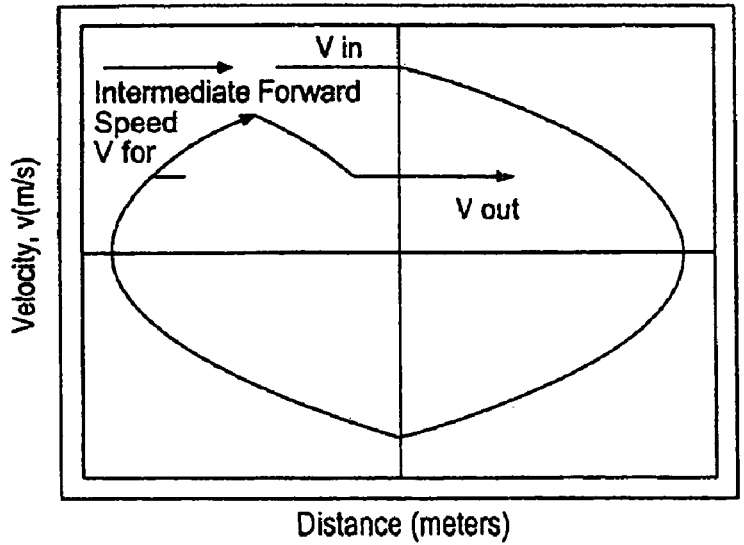
FIG. 9 shows a rate-change-football from high velocity to low velocity primarily using a back velocity with magnitude equal to the initial high velocity, but with the final approach towards the low velocity using an intermediate forward velocity according to an additional aspect of the invention.

FIG. 9 illustrates a rate change football down, using a back velocity with magnitude equal to the initial high velocity. In FIG. 9, the final approach toward the low velocity out uses an intermediate forward velocity to quicken the approach towards the point of starting R/W activity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of transitioning from one tape velocity to another tape velocity using a rate-change-backhitch in a tape drive for use with magnetic tapes, the tape drive including a housing for receiving a magnetic tape and a tape head for reading and writing the tracks of the magnetic tape as the tape moves past the tape head at a tape velocity, wherein the tape velocity is transitioned from an initial tape velocity to a final tape velocity using the rate-change-backhitch, the initial tape velocity being the tape velocity going into the rate-change-backhitch, and the final tape velocity being the tape velocity going out of the rate-change-backhitch, the method comprising:
   decelerating the tape from the initial tape velocity until the tape velocity reaches a peak back velocity having a magnitude that is intermediate between the initial tape velocity and the final tape velocity; and
   thereafter, accelerating the tape from the peak back velocity to complete the backhitch and reach the final tape velocity, whereby the tape velocity is transitioned from the initial tape velocity to the final tape velocity using a backhitch.

2. The method of claim 1 wherein the initial tape velocity exceeds the final tape velocity, whereby the transition is a velocity change down.

3. The method of claim 1 wherein the final tape velocity exceeds the initial tape velocity, whereby the transition is a velocity change up.

4. The method of claim 1 further comprising:
   upon reaching the peak back velocity, maintaining a relatively constant back velocity for a limited time period prior to accelerating the tape.

5. The method of claim 4 wherein the initial tape velocity exceeds the final tape velocity, whereby the transition is a velocity change down.

6. The method of claim 4 wherein the final tape velocity exceeds the initial tape velocity, whereby the transition is a velocity change up.

7. The method of claim 1 wherein the peak back velocity is selected so as to substantially minimize the time to complete the backhitch.

8. The method of claim 1 further comprising:
   determining a mismatch between the tape velocity and the host data rate; and
   in response to the determination, commencing with the backhitch to transition from the initial tape velocity to the final tape velocity.

9. The method of claim 1 further comprising:
   detecting a servo off track condition; and
   in response to the detection, commencing with the backhitch to transition from the initial tape velocity to the final tape velocity wherein the initial tape velocity exceeds the final tape velocity, whereby the transition is a velocity change down.

10. A method of transitioning from one tape velocity to another tape velocity using a rate-change-backhitch in a tape drive for use with magnetic tapes, the tape drive including a housing for receiving a magnetic tape and a tape head for reading and writing the tracks of the magnetic tape as the tape moves past the tape head at a tape velocity, wherein the tape velocity is transitioned from an initial tape velocity to a final tape velocity using the rate-change-backhitch, the initial tape velocity being the tape velocity going into the rate-change-backhitch, and the final tape velocity being the tape velocity going out of the rate-change-backhitch, wherein the initial tape velocity exceeds the final tape velocity, whereby the transition is a velocity change down, the method comprising:
   decelerating the tape from the initial tape velocity until the tape velocity reaches a peak back velocity;
   accelerating the tape from the peak back velocity until the tape velocity reaches a peak forward velocity having a magnitude that is intermediate between the initial tape velocity and the final tape velocity; and
   thereafter, decelerating the tape from the peak forward velocity to complete the backhitch and reach the final tape velocity, whereby the tape velocity is transitioned from the initial tape velocity to the final tape velocity using a backhitch.

11. The method of claim 10 wherein the peak back velocity is equal in magnitude to the initial tape velocity.

12. The method of claim 10 further comprising:
   determining a mismatch between the tape velocity and the host data rate; and
   in response to the determination, commencing with the backhitch to transition from the initial tape velocity to the final tape velocity.

13. The method of claim 10 further comprising:
   detecting a servo off track condition; and
   in response to the detection, commencing with the backhitch to transition from the initial tape velocity to the final tape velocity.

* * * * *